US012277230B2

(12) United States Patent
McCourt et al.

(10) Patent No.: US 12,277,230 B2
(45) Date of Patent: Apr. 15, 2025

(54) METHOD AND DEVICE FOR SYMBOLIC ANALYSIS OF A SOFTWARE PROGRAM

(71) Applicant: BlackBerry Limited, Waterloo (CA)

(72) Inventors: William James McCourt, West Lothian (GB); Niall Fitzgibbon, London (GB); Benjamin John Godwood, Chipping Norton (GB); Paul Compton Hirst, Tiverton (GB)

(73) Assignee: BlackBerry Limited, Waterloo (CA)

( * ) Notice: Subject to any disclaimer, the term of this patent is extended or adjusted under 35 U.S.C. 154(b) by 255 days.

(21) Appl. No.: 17/168,079

(22) Filed: Feb. 4, 2021

(65) Prior Publication Data

US 2021/0271762 A1 Sep. 2, 2021

(30) Foreign Application Priority Data

Feb. 28, 2020 (EP) ..................... 20160281

(51) Int. Cl.
*G06F 21/57* (2013.01)
*G06F 21/54* (2013.01)

(52) U.S. Cl.
CPC ............ *G06F 21/577* (2013.01); *G06F 21/54* (2013.01)

(58) Field of Classification Search
CPC ................................ G06F 21/577; G06F 21/54
See application file for complete search history.

(56) References Cited

U.S. PATENT DOCUMENTS

| 7,577,992 B2 * | 8/2009 | Abadi | G06F 21/52 726/22 |
| 9,411,565 B1 * | 8/2016 | Perron | G06F 8/443 |

(Continued)

FOREIGN PATENT DOCUMENTS

| CN | 102508766 A | * | 6/2012 |
| CN | 110287693 | | 9/2019 |
| WO | 02/103517 | | 12/2002 |

OTHER PUBLICATIONS

Gayatri Panicker, K. V. Krishna, and Purandar Bhaduri; Axiomatization of If-Then-Else Over Possibly Non-Halting Programs and Tests; 2010 Mathematics Subject Classification. 08A70, 03G25 and 68N15; (Year: 2010).*

(Continued)

*Primary Examiner* — Jahangir Kabir
*Assistant Examiner* — Chao Wang
(74) *Attorney, Agent, or Firm* — Fish & Richardson P.C.

(57) ABSTRACT

A method for symbolic analysis of a software program is described. The method comprises constructing a control flow graph (CFG), for a software program procedure, the CFG comprising nodes representing basic blocks reachable within the software program procedure, the basic blocks represented as respective functions from a first machine state on entry to a said basic block to a second machine state on exit from that basic block. The method further describes simplifying the CFG to a single node representing the software program procedure as a function from an input machine state on entry to the software program procedure to an output machine state on exit from the software program procedure, comparing said function to a rule set identifying vulnerabilities based on effects on the machine state; and determining a vulnerability within the software program procedure based on the comparing.

15 Claims, 11 Drawing Sheets

(56) References Cited

U.S. PATENT DOCUMENTS

| | | | |
|---|---|---|---|
| 10,628,286 B1* | 4/2020 | Iyer | G06F 8/33 |
| 10,684,966 B1* | 6/2020 | Hamman | G06F 13/1668 |
| 2003/0233641 A1 | 12/2003 | Hank | |
| 2004/0111713 A1 | 6/2004 | Rioux | |
| 2015/0220597 A1* | 8/2015 | Simhadri | G06F 16/24534 |
| | | | 707/797 |
| 2017/0242671 A1 | 8/2017 | Edler et al. | |
| 2019/0042760 A1* | 2/2019 | Gutson | G06F 21/54 |
| 2020/0394154 A1* | 12/2020 | Blackshear | H04L 9/0637 |

OTHER PUBLICATIONS

S. Sparks • S. Embleton • R. Cunningham • C. Zou; Automated Vulnerability Analysis: Leveraging Control Flow for Evolutionary Input Crafting; Twenty-Third Annual Computer Security Applications Conference (ACSAC 2007) (2007, pp. 477-486); (Year: 2007).*

Pascal Nasahl • Salmin Sultana • Hans Liljestrand • Karanvir Grewal • Michael LeMay • David M. Durham • David Schrammel • Stefan Mangard; EC-CFI: Control-Flow Integrity via Code Encryption Counteracting Fault Attacks; 2023 IEEE International Symposium on Hardware Oriented Security and Trust; (Year: 2023).*

C Ferguson • Qijun Gu; Self-Healing Control Flow Protection in Sensor Applications; IEEE Transactions on Dependable and Secure Computing (vol. 8, Issue: 4, 2011, pp. 602-616); (Year: 2011).*

Extended European Search Report issued in European Application No. 20160281.0 on Aug. 28, 2020, 6 pages.

\* cited by examiner

100

110 construct CFG for a software program procedure, the CFG comprising nodes representing basic blocks reachable within the procedure, the basic blocks represented as respective functions from a first machine state on entry to a said basic block to a second machine state on exit from that basic block

112 simplify the CFG to a single node representing the procedure as a function from an input machine state on entry to the procedure to an output machine state on exit from the procedure

114 compare the function to a rule set identifying vulnerabilities based on effects on the machine state

116 determine a vulnerability within the procedure based on the comparing

METHOD AND DEVICE FOR SYMBOLIC ANALYSIS OF A SOFTWARE PROGRAM

CROSS-REFERENCE TO RELATED APPLICATIONS

This application claims the benefit of European Patent Application No. 20160281.0 filed on Feb. 28, 2020, the entire contents of which are incorporated by reference in its entirety.

FIELD OF TECHNOLOGY

The present disclosure relates to symbolic analysis of a software program.

BACKGROUND

During development of computer software, it can be beneficial to examine the software for security vulnerabilities and software bugs. It can also be beneficial to be able to examine software programs for security vulnerabilities and software bugs prior to incorporating the software into a product or deploying software. In some instances, it may be beneficial to find potential vulnerabilities and bugs in native application binaries for which full source code is not available.

BlackBerry® Jarvis™ is a binary static application security testing, SAST, platform that extracts characteristics and attributes from compiled binaries, to examine software programs for security vulnerabilities and software bugs, so access to source code is not required.

Angr is an open source symbolic execution and constraint solving tool written in Python. It has been used to do automatic vulnerability discovery in a toy environment as part of the Cyber Grand Challenge. Normal use is scripted by the reverse engineer, generally in an exploratory style of programming. Angr's approach is to symbolically execute code from an address as directed by the user, maintaining multiple symbolic states as a result of each branch.

Improvements in methods for analysis of software programs are beneficial.

SUMMARY

Accordingly, there is provided a method, a computer program and a computing device as detailed in the claims that follow.

An aspect of the present disclosure provides a method for symbolic analysis of a software program. The method comprises a step of constructing a control flow graph, CFG, for a software program procedure. The CFG comprises nodes representing basic blocks reachable within the software program procedure. The basic blocks are represented as respective functions from a first machine state on entry to a basic block to a second machine state on exit from that basic block. The method further comprises a step of simplifying the CFG to a single node representing the software program procedure as a function from an input machine state on entry to the software program procedure to an output machine state on exit from the software program procedure. The method further comprises a step of comparing said function to a rule set identifying vulnerabilities based on effects on the machine state and a step of determining a vulnerability within the software program procedure based on the comparing.

By translating compiled code into a normalised and functional form, it may be easier to analyse the code and perform pattern matching of known bad programming constructs against target code.

Another aspect of the disclosure provides a computing device comprising a processing circuitry and a memory. The memory contains instructions executable by the processing circuitry whereby the apparatus is operative to construct a control flow graph, CFG, for a software program procedure. The CFG comprises nodes representing basic blocks reachable within the software program procedure. The basic blocks are represented as respective functions from a first machine state on entry to a said basic block to a second machine state on exit from that basic block. The memory contains further instructions executable by the processing circuitry whereby the apparatus is operative to simplify the CFG to a single node representing the software program procedure as a function from an input machine state on entry to the software program procedure to an output machine state on exit from the software program procedure. The memory contains further instructions executable by the processing circuitry whereby the apparatus is operative to compare said function to a rule set identifying vulnerabilities based on effects on the machine state and determine a vulnerability within the software program procedure based on the comparing matching said function to a rule of said rule set.

BRIEF DESCRIPTION OF THE DRAWINGS

Embodiments of the present disclosure will now be described, by way of example only, with reference to the attached figures, in which:

FIGS. 1 and 2A and 2B are flowcharts illustrating methods for symbolic analysis of a software program in accordance with the present disclosure;

DETAILED DESCRIPTION

Figure 2A:
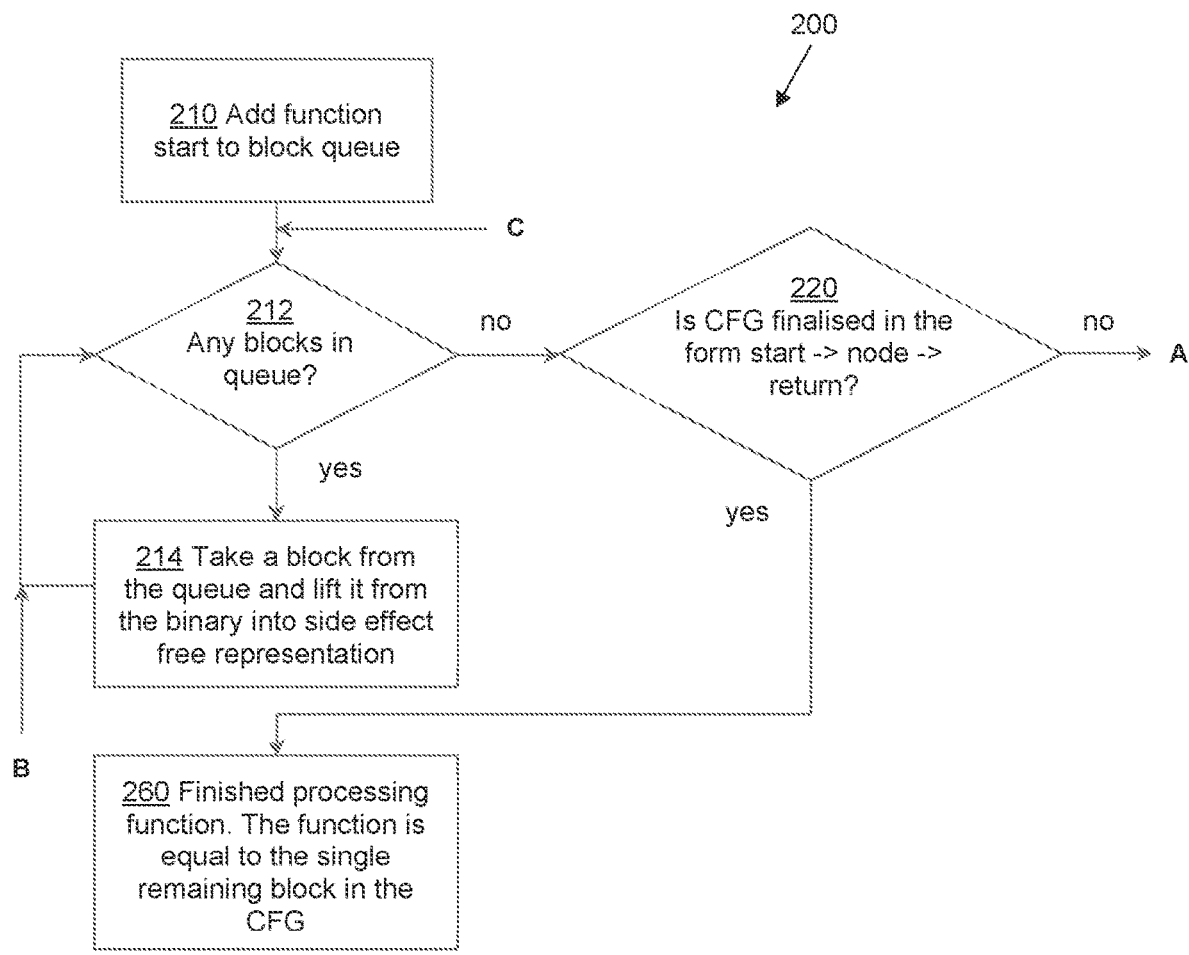

The following describes a method of translating a native software program procedure to a functional form comprising symbolically executing basic blocks from the start of the procedure, and building a control flow graph, CFG, for the procedure in which each basic block is associated with a symbolic change of state, including machine registers, memory and side effects. The CFG is then reduced to a single node, if possible, through the process of merging basic blocks through symbolic substitution and the lifting of back edges into explicit loop expressions. This provides a single expression representing the symbolic state change for the entire procedure, if the procedure is reducible in such a way. By translating compiled code into a normalised and functional form, it may be easier to analyse the code and perform pattern matching of known bad programming constructs against target code.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

A flowchart illustrating a method for symbolic analysis of a software program is shown in FIG. 1. The method comprises a step of constructing 110 a control flow graph, CFG, for a software program procedure. The CFG comprises nodes representing basic blocks reachable within the software program procedure. The basic blocks are represented as respective functions from a first machine state on entry to a respective basic block to a second machine state on exit from that basic block. The method comprises a step of simplifying 112 the CFG to a single node representing the software program procedure as a function from an input machine state on entry to the software program procedure to an output machine state on exit from the software program procedure. The method comprises a step of comparing 114 said function to a rule set identifying vulnerabilities based on effects on the machine state. The method comprises a step of determining 116 a vulnerability within the software program procedure based on the comparing. It will be appreciated that different forms of analysis can be effected within the context of the present teaching. For example, it is possible to adopt a methodology based on tree-based pattern matching with some constraint solving on variables, but other arrangements based on a more formal automated theorem proving could be used, as well as any number of other methods.

In an embodiment, the software program procedure comprises native application compiled code.

In an embodiment, constructing the CFG comprises lifting basic blocks from the software program procedure and symbolically executing the basic blocks from the start of the software program procedure to obtain functions representing the basic blocks as symbolic changes of the machine state.

In an embodiment, the functions are side-effect free functions.

In an embodiment, simplifying the CFG comprises at least one of merging basic blocks through symbolic substitution of the respective functions and replacing back edges within the CFG with explicit loop expressions.

Figure 2B:
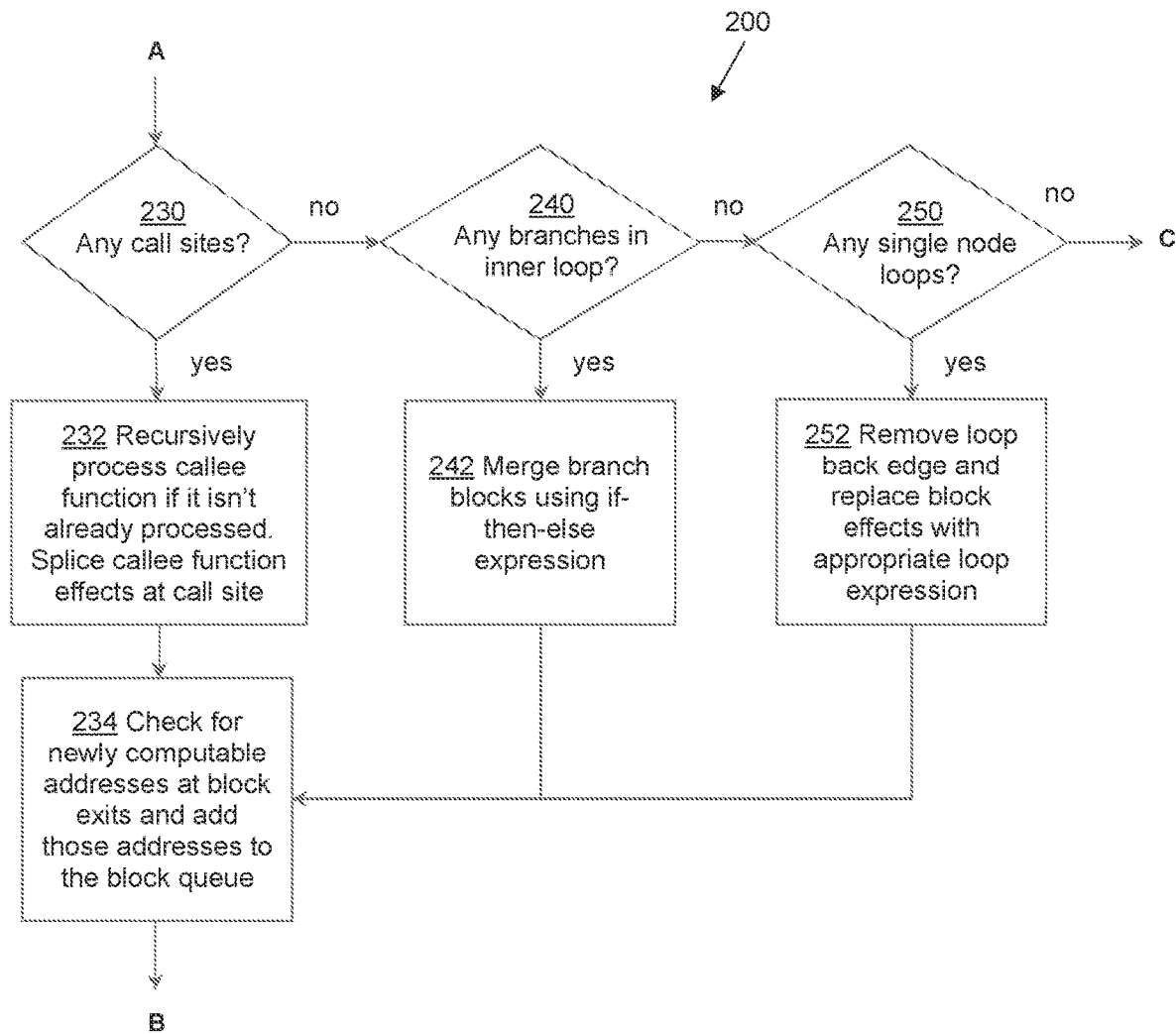

Referring to FIGS. 2A and 2B, an embodiment provides a method 200 for symbolic analysis of a software program. The method comprises a step of constructing a control flow graph, CFG, for a software program procedure. Starting with the software program procedure's entry point 210, the basic blocks of the function are lifted 212, 214 from the procedure's binary assembly language into a side-effect free representation. The basic blocks are symbolically executed from the start of the software program procedure to obtain side-effect free functions representing the basic blocks as symbolic changes of the machine state.

A basic block is defined as a sequence of assembly instructions that execute in sequence. A basic block ends when there is branch to more than one possible address, such as a conditional jump instruction. Each basic block is represented internally as a pure function from the machine's state (including CPU registers and memory) on entry to that basic block to the machine's state on exit from the basic block.

Processing of the basic blocks proceeds with new basic blocks processed 234 from all possible exit(s) from the current basic block. This recursive processing results in the construction of a CFG containing all the basic blocks reachable within the procedure.

The method comprises a step of simplifying the CFG to a single node representing the software program procedure as a function from an input machine state on entry to the software program procedure to an output machine state on exit from the software program procedure. The control flow graph is repeatedly processed and simplified until it is reduced down to a single node.

The method 200 includes checking 220 whether the CFG contains a single node, i.e. whether the CFG has the form Start→Node→Return. If yes, processing is complete 260. If not, the method proceeds to checking 230 whether there are any call sites, i.e. does the CFG contain a call to another procedure?, identifying an inner loop and checking 240 whether there are any branches in the inner loop, and checking 250 whether there are any single node loops.

If the CFG contains a call to another procedure 230, simplifying the CFG comprises recursively processing 232 that procedure. Then the call to that procedure in the CFG is replaced by a function representing the machine state change resulting from that procedure.

Where the CFG contains a node comprising a return instruction, that node is instead linked to a single exit node.

Simplifying the CFG comprises merging branches within the CFG by replacing the branches with a single node comprising an if-then-else function representing a machine state change resulting from the branches.

Simplifying the CFG comprises performing loop detection on the CFG and simplifying the loops. Beginning with the innermost loop (if there is one), branches 240 within the loop are replaced with single nodes using if-then-else functions representing respective machine state changes resulting from the branches.

Once the innermost loop is reduced to a single node as a result of the previous step, it is replaced with a non-loop node containing a loop expression, such as a do-while function or recursive function invocations, that expresses the change in machine state on each iteration of the loop and the loop exit condition.

Once a loop has been eliminated, processing proceeds with the next innermost loop, and so on, until the CFG contains no loops. When the CFG contains no loops, the remaining nodes are merged using if-then-else operations, as described above. Certain imperative language constructs and compiler optimizations can result in irreducible loops in the control flow graph. In these cases, processing of the procedure fails.

The definition of the procedure becomes a function from one machine state to a resultant machine state, which is the same as the definition of the single basic block/node remaining in the CFG. The representation of the procedure and basic blocks as a side-effect free function from one state to another is repeatedly simplified and normalised so that the resulting function can be matched in a deterministic way.

The method 200 further comprises matching the normalised functional representation of the procedure against a set of rules to identify vulnerabilities based on the effect of the procedure on the machine state. It will be appreciated the implementation of the vulnerability analysis may vary and that this assessment of potential vulnerabilities typically happens after the procedures are transformed into functional representations.

Figure 3:
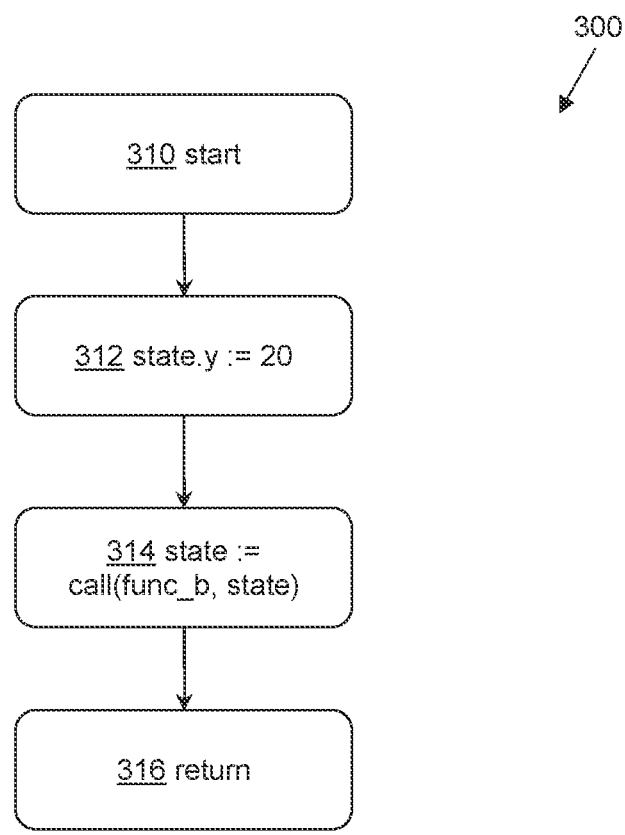
FIGS. 3 to 13 are control flow graphs constructed according to methods for symbolic analysis of a software program in accordance with the present disclosure.
Figure 4:
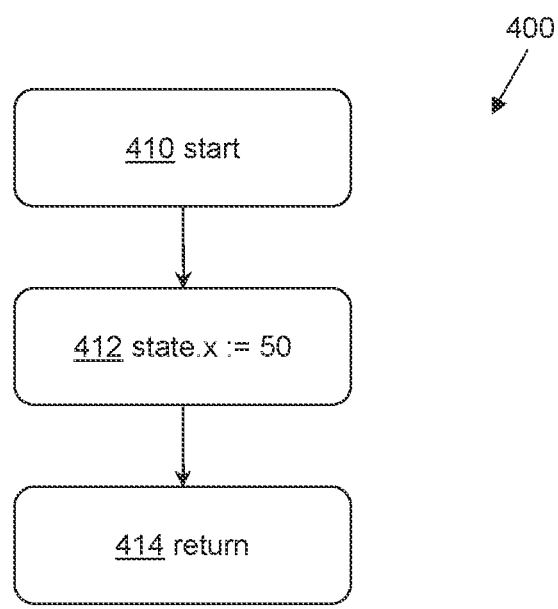
Figure 5:
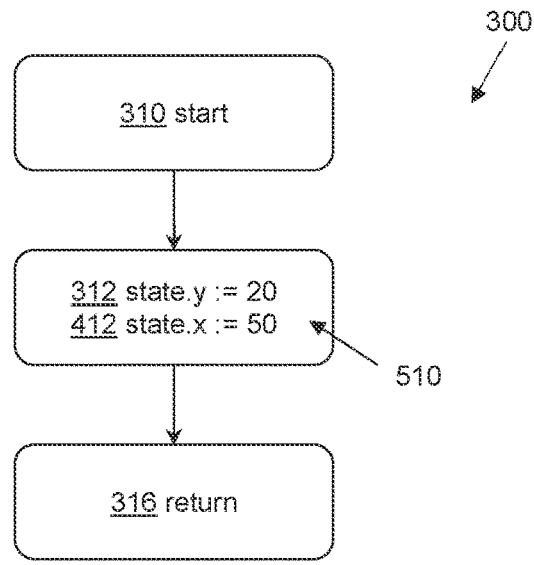

Referring to FIGS. 3 to 5, an embodiment provides a method for symbolic analysis of a software program. In this embodiment, the method constructs a CFG 300 of the software program procedure, func_a, as shown in FIG. 3. The CFG 300 contains a call 314 to another procedure, func_b, having the CFG 400 shown in FIG. 4. Simplifying the CFG 300 of func_a comprises recursively processing func_b and then replacing the call to func_b in the CFG of func_a with a function representing the machine state change resulting from func_b. Referring to the CFGs, nodes 312 and 314 of func_a are replaced with a single node 510 comprising functions 312 and 412, as shown in FIG. 5.

Figure 6:
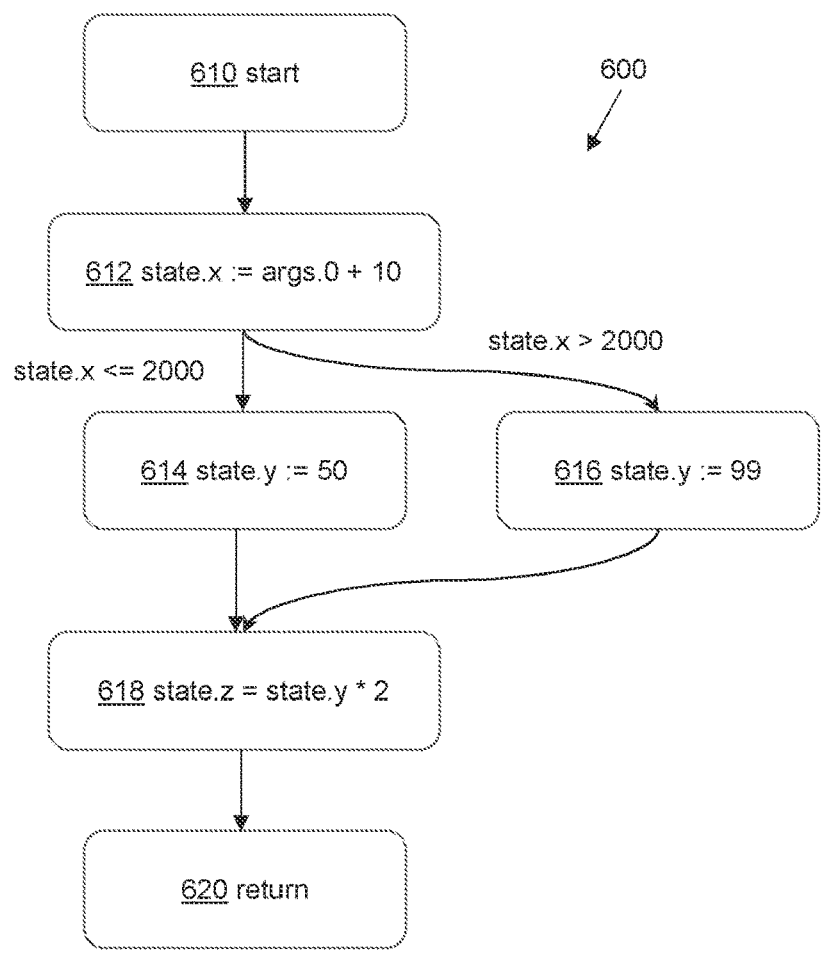
Figure 7:
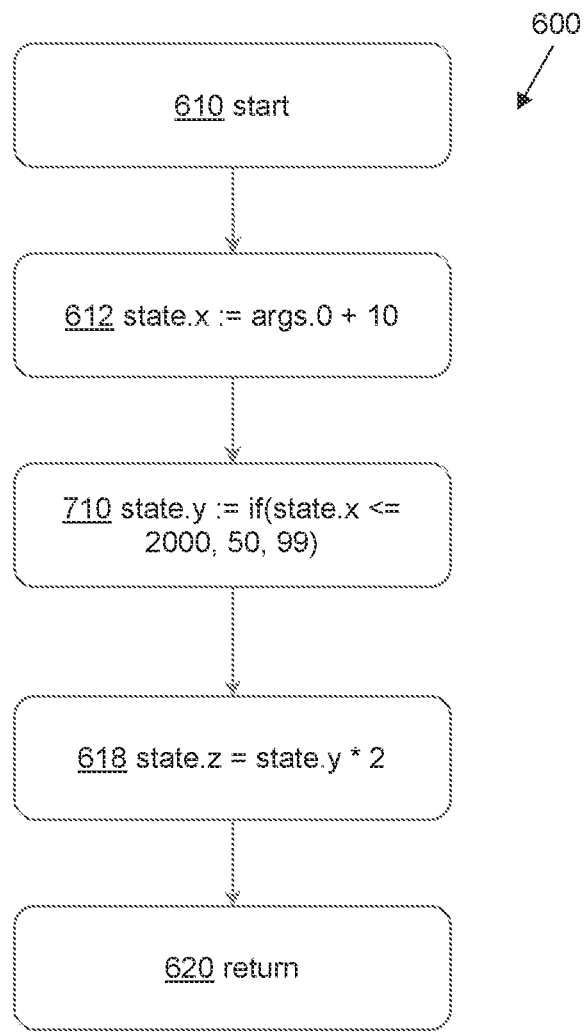
Figure 8:
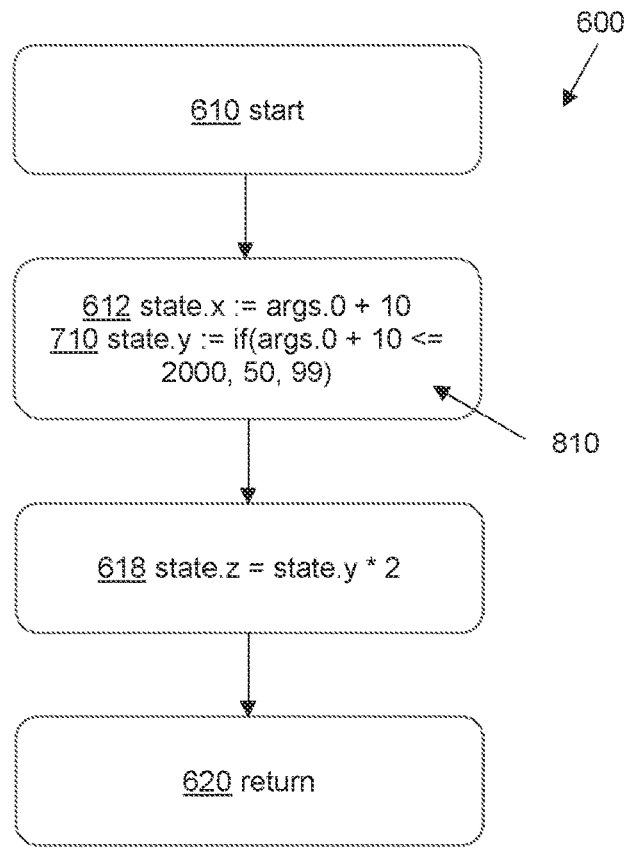
Figure 9:
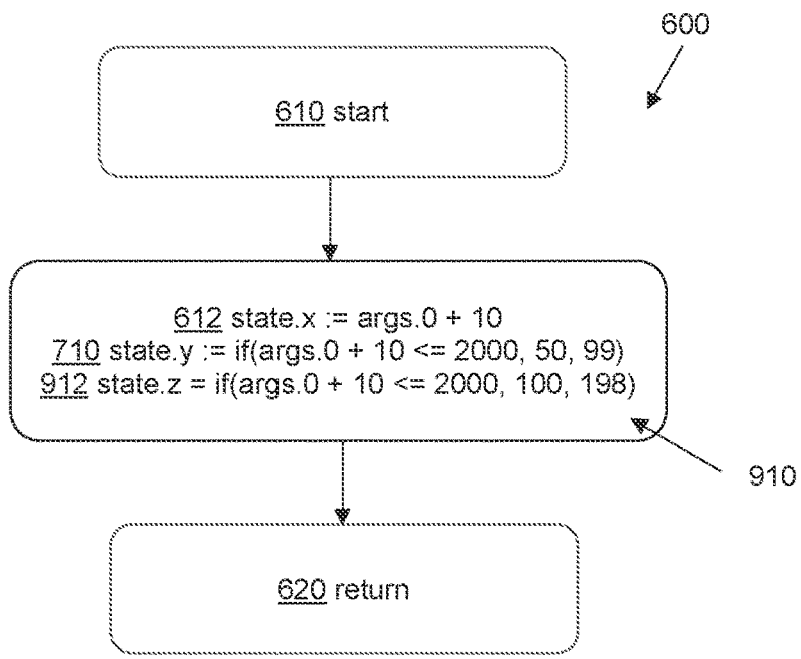

Referring to FIGS. 6 to 9, an embodiment provides a method for symbolic analysis of a software program. In this embodiment, the method constructs a CFG 600 of the software program procedure as shown in FIG. 6. The CFG 600 comprises branches 614, 616. The method of this embodiment comprises merging the branches by replacing the branches with a single node comprising an if-then-else function 710 representing a machine state change resulting from the branches, as shown in FIG. 7. The method further comprises merging blocks/nodes 612 and 710, into a single node 810, and then merging nodes 810 and 618 into a single node 910.

Figure 10:
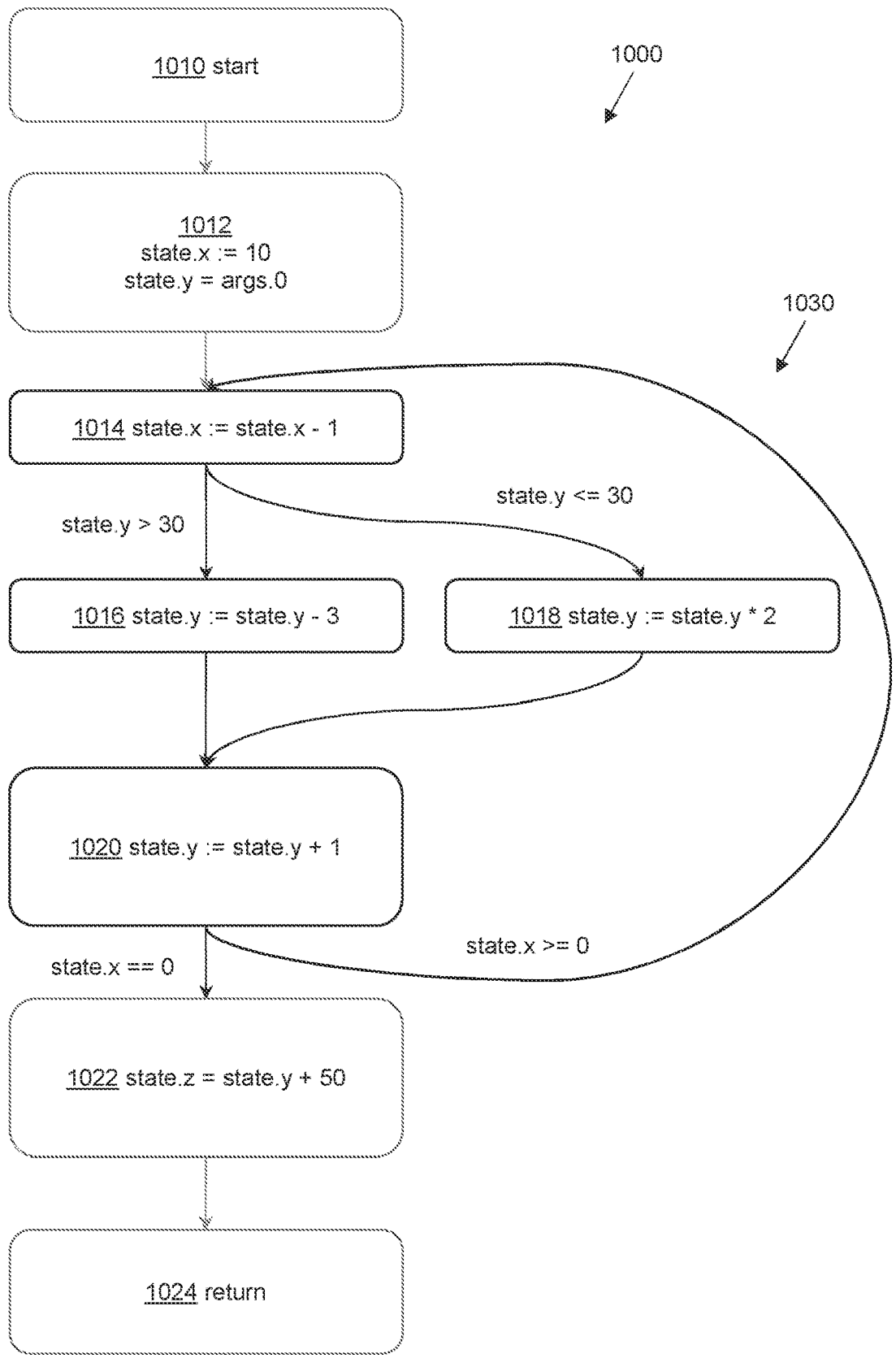

Referring to FIGS. 10 to 13, an embodiment provides a method for symbolic analysis of a software program. In this embodiment, the method constructs a CFG 1000 of the software program procedure as shown in FIG. 10. The CFG comprises a loop 1030. Simplifying the CFG 1000 comprises an initial step of performing loop detection on the CFG, resulting in loop 1030 being detected.

Figure 11:
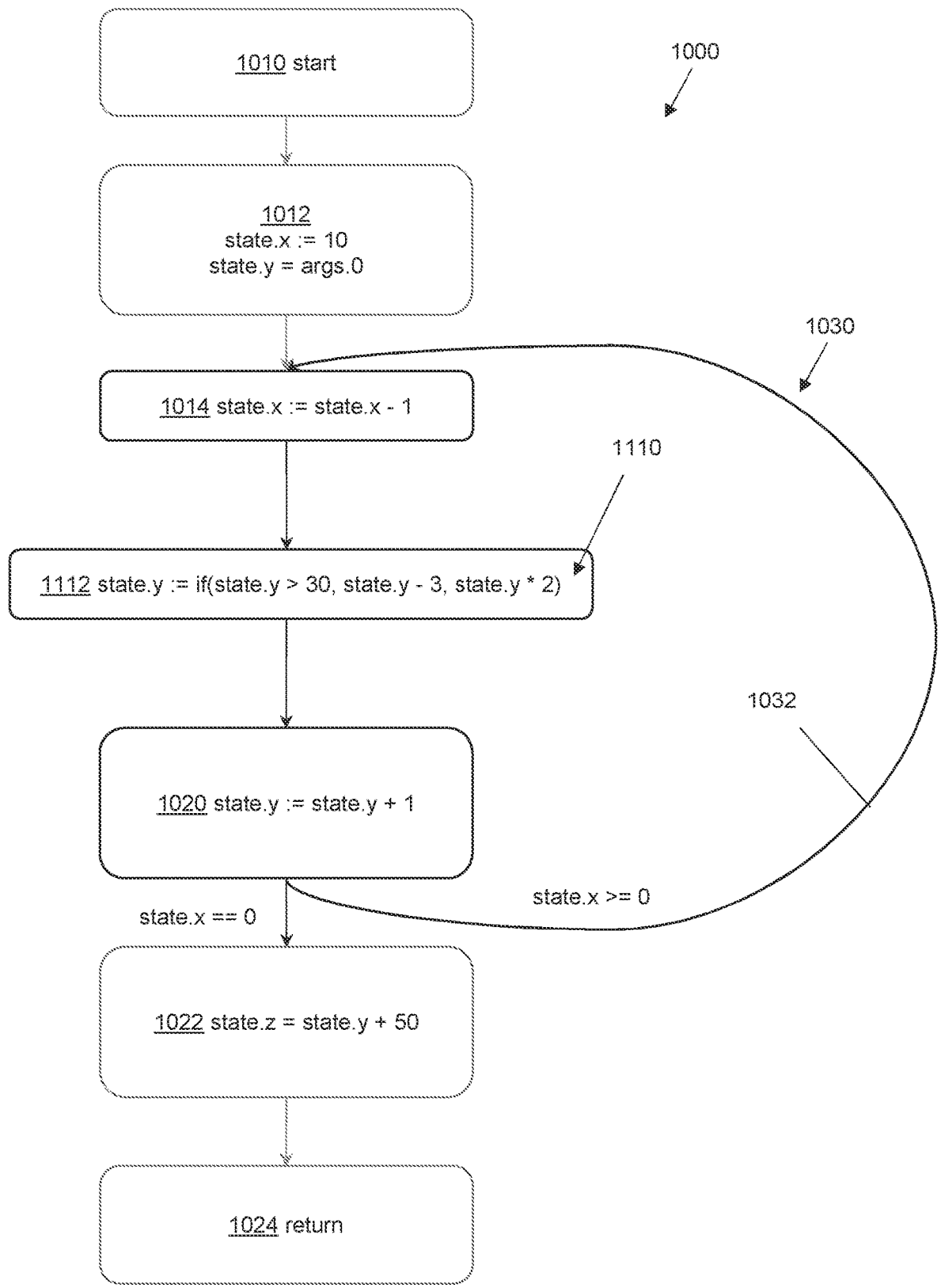
Figure 12:
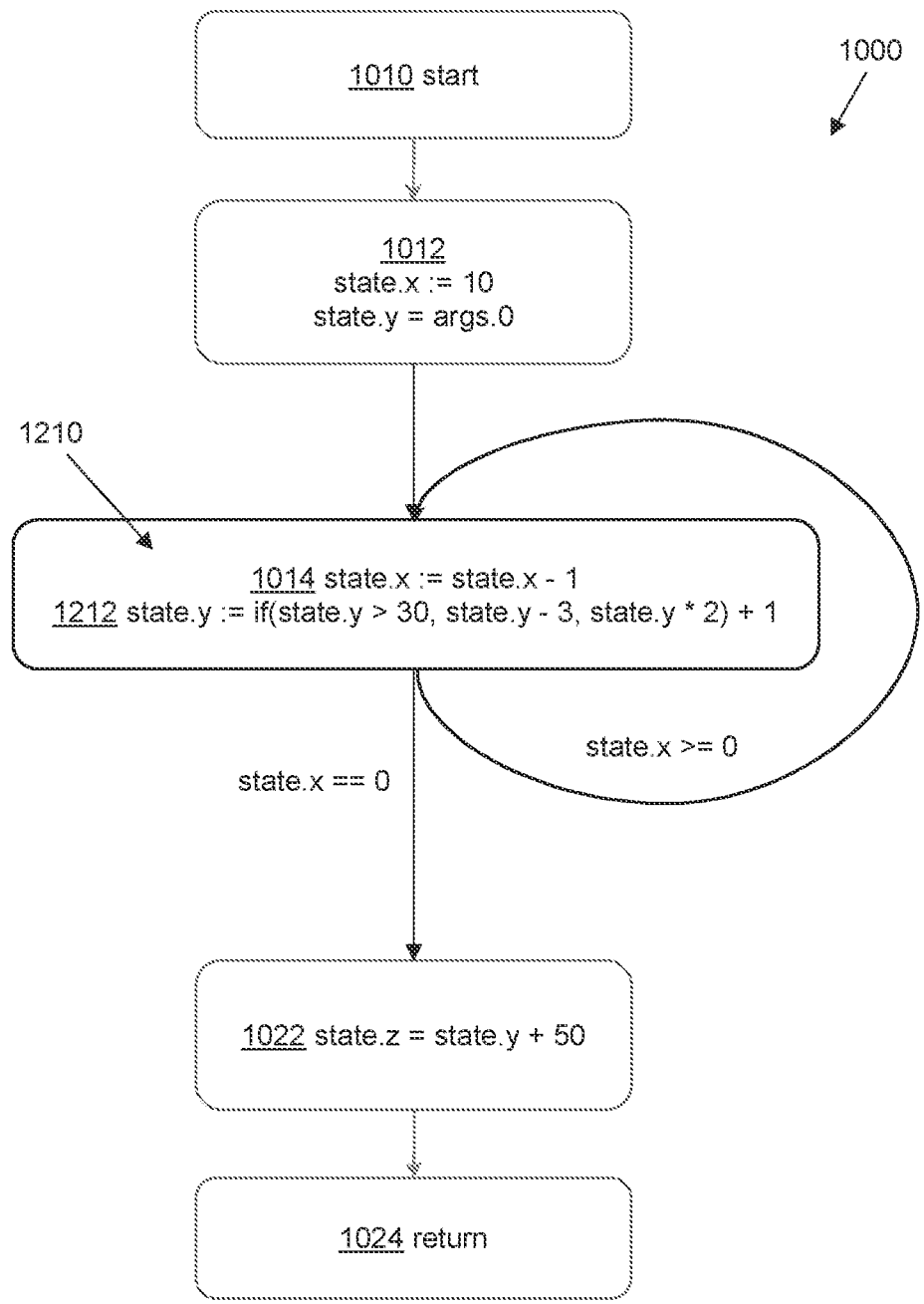
Figure 13:
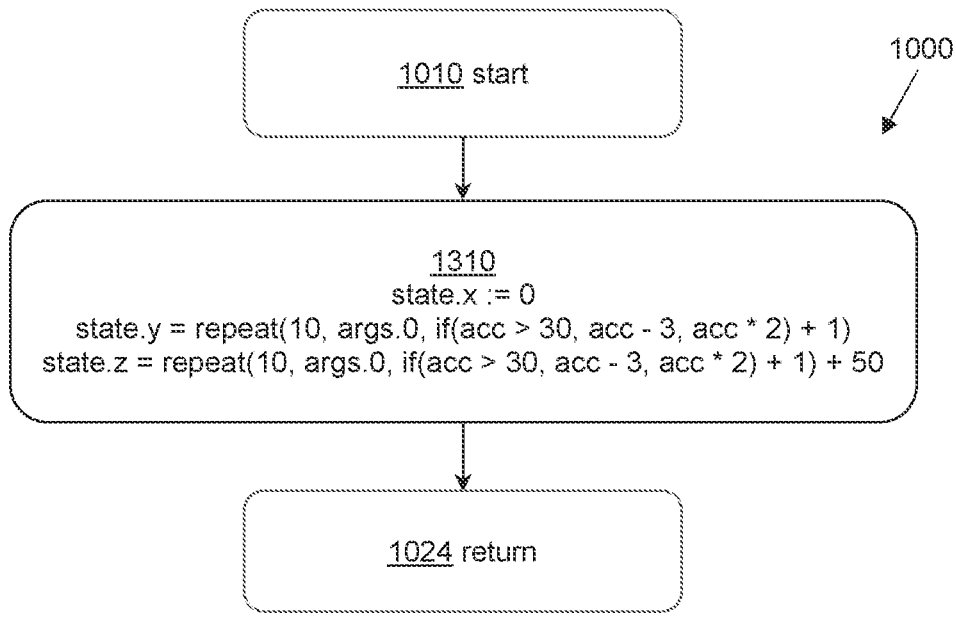

The method proceeds with identifying the inner-most loop, in this example there is a single loop 1030 which comprises branches 1016, 1018. The method proceeds, as illustrated in FIG. 11, by replacing the branches within the loop with a single node 1110 comprising an if-then-else function 1112 representing a machine state change resulting from the branches. The method then proceeds, as illustrated in FIG. 12, by replacing the nodes 1014, 1112, 1020 and back edge 1032 within the loop with a loop node 1210 comprising a function 1014, 1212 representing a machine state change resulting from the loop 1030. The method then proceeds, as illustrated in FIG. 13, by replacing the loop node 1210 with a non-loop node 1310 comprising a loop expression 1310 representing a machine state change on each iteration of the loop and a loop exit condition.

The method proceeds by iteratively identifying a next inner-most loop in the CFG and repeating the replacing steps until the CFG contains no loops. In this example, there is only a single loop, so the method ends.

An embodiment provides a computer program comprising instructions which when executed by at least one processor cause the at least one processor to perform the steps of the method 100, 200 for symbolic analysis of a software program described above with reference to any of FIGS. 1 to 13.

An embodiment provides a carrier containing a computer program comprising instructions which when executed by at least one processor cause the at least one processor to perform the steps of the method 100, 200 for symbolic analysis of a software program described above with reference to any of FIGS. 1 to 13. The carrier is one of an electronic signal, optical signal, radio signal, or computer readable storage medium.

An embodiment provides a computer implemented method for symbolic analysis of a software program. Referring to FIG. 1, the method comprises constructing 110 a control flow graph, CFG, for a software program procedure. The CFG comprises nodes representing basic blocks reachable within the software program procedure. The basic blocks are represented as respective functions from a first machine state on entry to a said basic block to a second machine state on exit from that basic block. The method comprises simplifying 112 the CFG to a single node representing the software program procedure as a function from an input machine state on entry to the software program procedure to an output machine state on exit from the software program procedure. The method comprises comparing 114 the function to a rule set identifying vulnerabilities based on effects on the machine state and determining 116 a vulnerability within the software program procedure based on the comparing matching the function to a rule of said rule set.

An embodiment provides a computing device. The method 100, 200 described above with reference to any of FIGS. 1 to 13 may be carried out by software executed, for example, by a processor of the computing device. Coding of software for carrying out such a method is within the scope of a person of ordinary skill in the art given the present description. The method may contain additional or fewer processes than shown and/or described and may be performed in a different order. Computer-readable code executable by at least one processor, such as the processor, of the computing device to perform the method may be stored in a computer-readable storage medium, such as a non-transitory computer-readable medium.

Figure 14:
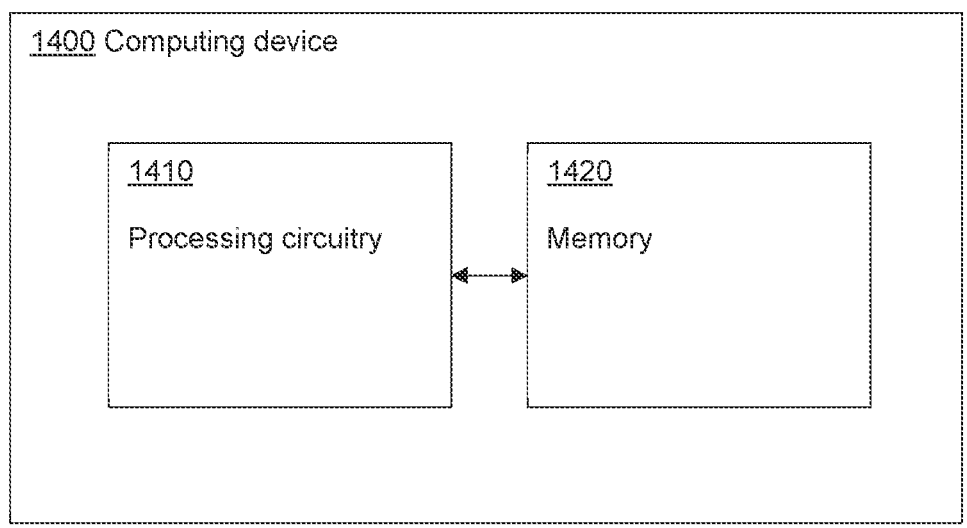
FIG. 14 is a block diagram of a computing device in accordance with the present disclosure.

Referring to FIG. 14, an embodiment provides a computing device 1400 comprising a processing circuitry 1410 and a memory 1420. It will be appreciated that the computing device can be implemented in one or more physical forms. For example, within the context of the present teaching, a computing device can include one or more servers which can be co-located or distributed within cloud-based infrastructure. It will be appreciated also that the present teaching should not be construed as being limited to the specifics of any one type of software to be analyzed. For example, within the context of the present teaching the software being analyzed can pertain to software operating on one or more of vehicles, IoT devices, mobile phones, computers, end-points and the like. Within this context of application, it will be understood that the memory contains instructions executable by the processing circuitry whereby the apparatus is operative to perform operations including:

constructing a control flow graph, CFG, for a software program procedure, the CFG comprising nodes representing basic blocks reachable within the software program procedure, the basic blocks represented as respective functions from a first machine state on entry to a said basic block to a second machine state on exit from that basic block;

simplifying the CFG to a single node representing the software program procedure as a function from an input machine state on entry to the software program procedure to an output machine state on exit from the software program procedure;

comparing said function to a rule set identifying vulnerabilities based on effects on the machine state; and determining a vulnerability within the software program procedure based on the comparing matching said function to a rule of said rule set.

The scope of the claims should not be limited by the preferred embodiments set forth in the examples but should be given the broadest interpretation consistent with the description as a whole.

What is claimed is:

1. A method of symbolic analysis of a software program, the method comprising:

constructing, by at least one processor, a control flow graph (CFG), of a software program procedure, the CFG comprising nodes representing basic blocks reachable within the software program procedure, the basic blocks represented as respective functions from a first machine state on entry to a said basic block to a second machine state on exit from that basic block, wherein constructing the CFG comprises symbolically executing the basic blocks of the software program procedure to obtain side-effect free functions representing the basic blocks as symbolic changes of the machine states;

simplifying, by the at least one processor, the CFG to a single node representing the software program procedure as a function from an input machine state on entry to the software program procedure to an output machine state on exit from the software program procedure, wherein simplifying the CFG comprises at least one of merging basic blocks through symbolic substitution of the respective functions or replacing back edges within the CFG with explicit loop expressions, wherein simplifying the CFG comprises:

replacing return instructions within the CFG with links to respective nodes having a single exit; and recursively processing another procedure and replacing a call to the another procedure in the CFG with a function representing a machine state change resulting from the another procedure;

comparing, by the at least one processor, said function to a rule set identifying one or more vulnerabilities based on one or more effects on the machine states; and preventing, by the at least one processor, deployment of the software program procedure in response to determining a vulnerability within the software program procedure based on the comparing.

2. The method according to claim 1, wherein the software program procedure comprises native application compiled code.

3. The method according to claim 1, wherein simplifying the CFG comprises merging branches within the CFG by replacing the branches with a single node comprising an if-then-else function representing a machine state change resulting from the branches.

4. The method according to claim 1, wherein simplifying the CFG comprises initially:
 performing loop detection on the CFG;
 identifying an inner-most loop;
 replacing branches within the loop with a single node comprising an if-then-else function representing a machine state change resulting from the branches;
 replacing the nodes and edges within said loop with a loop node comprising a function representing a machine state change resulting from said loop;
 replacing said loop node with a non-loop node comprising a loop expression representing a machine state change on each iteration of the loop and a loop exit condition; and
 iteratively identifying a next inner-most loop in the CFG and repeating said replacing steps until the CFG contains no loops.

5. The method of claim 1 wherein the comparing comprises matching the function to one or more rules of the rule set.

6. A non-transitory computer-readable media comprising instructions which when executed by at least one processor cause the at least one processor to perform operations comprising:
 constructing a control flow graph (CFG) of a software program procedure, the CFG comprising nodes representing basic blocks reachable within the software program procedure, the basic blocks represented as respective functions from a first machine state on entry to a said basic block to a second machine state on exit from that basic block, wherein constructing the CFG comprises symbolically executing the basic blocks of the software program procedure to obtain side-effect free functions representing the basic blocks as symbolic changes of the machine states;

simplifying the CFG to a single node representing the software program procedure as a function from an input machine state on entry to the software program procedure to an output machine state on exit from the software program procedure, wherein simplifying the CFG comprises at least one of merging basic blocks through symbolic substitution of the respective functions or replacing back edges within the CFG with explicit loop expressions, wherein simplifying the CFG comprises replacing return instructions within the CFG with links to respective nodes having a single exit; and recursively processing another procedure and replacing a call to the another procedure in the CFG with a function representing a machine state change resulting from the another procedure;

comparing said function to a rule set identifying one or more vulnerabilities based on one or more effects on the machine states; and preventing deployment of the software program procedure in response to determining a vulnerability within the software program procedure based on the comparing.

7. The non-transitory computer-readable media according to claim 6, wherein the software program procedure comprises native application compiled code.

8. The non-transitory computer-readable media according to claim 6, wherein simplifying the CFG comprises merging branches within the CFG by replacing the branches with a single node comprising an if-then-else function representing a machine state change resulting from the branches.

9. The non-transitory computer-readable media according to claim 6, wherein simplifying the CFG comprises initially:
 performing loop detection on the CFG;
 identifying an inner-most loop;
 replacing branches within the loop with a single node comprising an if-then-else function representing a machine state change resulting from the branches;
 replacing the nodes and edges within said loop with a loop node comprising a function representing a machine state change resulting from said loop;
 replacing said loop node with a non-loop node comprising a loop expression representing a machine state change on each iteration of the loop and a loop exit condition; and
 iteratively identifying a next inner-most loop in the CFG and repeating said replacing steps until the CFG contains no loops.

10. The non-transitory computer-readable media according to claim 6, wherein the comparing comprises matching the function to one or more rules of the rule set.

11. A computing device comprising at least one processor and a memory, said memory containing instructions executable by said at least one processor to perform operations including:
 constructing a control flow graph (CFG), for a software program procedure, the CFG comprising nodes representing basic blocks reachable within the software program procedure, the basic blocks represented as respective functions from a first machine state on entry to a said basic block to a second machine state on exit from that basic block, wherein constructing the CFG comprises symbolically executing the basic blocks of the software program procedure to obtain side-effect free functions representing the basic blocks as symbolic changes of the machine states;

simplifying the CFG to a single node representing the software program procedure as a function from an input machine state on entry to the software program procedure to an output machine state on exit from the software program procedure, wherein simplifying the CFG comprises at least one of merging basic blocks through symbolic substitution of the respective functions or replacing back edges within the CFG with explicit loop expressions, wherein simplifying the CFG comprises:

replacing return instructions within the CFG with links to respective nodes having a single exit; and recursively processing another procedure and replacing a call to the another procedure in the CFG with a function representing a machine state change resulting from the another procedure;

comparing said function to a rule set identifying vulnerabilities based on effects on the machine states; and preventing deployment of the software program procedure in response to determining a vulnerability within the software program procedure based on the comparing matching said function to a rule of said rule set.

12. The device according to claim 11, wherein the software program procedure comprises native application compiled code.

13. The device according to claim 11, wherein simplifying the CFG comprises merging branches within the CFG by replacing the branches with a single node comprising an if-then-else function representing a machine state change resulting from the branches.

14. The device according to claim 11, wherein simplifying the CFG comprises initially:

performing loop detection on the CFG;

identifying an inner-most loop;

replacing branches within the loop with a single node comprising an if-then-else function representing a machine state change resulting from the branches;

replacing the nodes and edges within said loop with a loop node comprising a function representing a machine state change resulting from said loop;

replacing said loop node with a non-loop node comprising a loop expression representing a machine state change on each iteration of the loop and a loop exit condition; and iteratively identifying a next inner-most loop in the CFG and repeating said replacing steps until the CFG contains no loops.

15. The device according to claim 11, wherein the comparing comprises matching the function to one or more rules of the rule set.

* * * * *